(12) United States Patent
McGee

(10) Patent No.: US 7,695,400 B2
(45) Date of Patent: Apr. 13, 2010

(54) SPEED-LIMITING ACCESSORY DRIVE SYSTEM AND METHOD OF CONTROLLING SPEED OF A DRIVEN ACCESSORY

(75) Inventor: Gary E. McGee, Oxford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 474 days.

(21) Appl. No.: 11/684,977

(22) Filed: Mar. 12, 2007

(65) Prior Publication Data

US 2008/0228351 A1 Sep. 18, 2008

(51) Int. Cl.
B60W 10/08 (2006.01)

(52) U.S. Cl. .......................................... 477/5; 477/902

(58) Field of Classification Search ........................ None
See application file for complete search history.

(56) References Cited

U.S. PATENT DOCUMENTS

| | | | | |
|---|---|---|---|---|
| 5,635,805 A | * | 6/1997 | Ibaraki et al. ............... | 318/139 |
| 5,942,862 A | * | 8/1999 | Yamada et al. ............... | 318/9 |
| 6,048,288 A | * | 4/2000 | Tsujii et al. ..................... | 477/5 |
| 6,453,865 B2 | * | 9/2002 | Hirose et al. ............. | 123/179.4 |
| 6,793,059 B2 | * | 9/2004 | Okada et al. ................ | 192/84.1 |
| 7,099,768 B2 | * | 8/2006 | Moriya ........................ | 701/112 |
| 7,506,711 B2 | * | 3/2009 | Usoro ...................... | 180/65.25 |
| 2007/0049455 A1 | * | 3/2007 | Kuramochi ..................... | 477/3 |
| 2008/0109139 A1 | * | 5/2008 | Muta et al. .................... | 701/48 |

* cited by examiner

*Primary Examiner*—Roger L Pang
*Assistant Examiner*—Justin Holmes
(74) *Attorney, Agent, or Firm*—Quinn Law Group, PLLC

(57) ABSTRACT

A speed-limiting accessory drive system is provided that limits the speed range over which an engine-driven accessory operates while maintaining the operating speed range of the engine. A torque-transmitting mechanism is selectively engagable to operatively connect the engine and the accessory. A controller is configured to maintain the torque-transmitting mechanism in an engaged state only when monitored engine speed is within a predetermined speed range and to control a drive motor to drive the driven accessory when the monitored engine speed is not within the predetermined range. A method of controlling the speed of at least one driven accessory, which may be carried out using the speed-limiting accessory drive system, is also provided.

10 Claims, 2 Drawing Sheets

SPEED-LIMITING ACCESSORY DRIVE SYSTEM AND METHOD OF CONTROLLING SPEED OF A DRIVEN ACCESSORY

TECHNICAL FIELD

The invention relates to a vehicle accessory drive system having a torque-transmitting mechanism to selectively connect an engine to an accessory. The invention also relates to a method of controlling the speed of a driven accessory.

BACKGROUND OF THE INVENTION

Vehicle accessories such as air conditioning systems, power steering systems and water pumps are typically driven directly by the engine crankshaft through, for example, a belt and pulley system. Therefore, the accessories must be capable of operating over the entire speed range of the engine, as the operating speeds of the accessories in a conventional drive system are directly proportional to the speed of the engine. The accessories are therefore typically designed to provide full capacity when the engine is operating at the low end of the engine speed range, because the accessories must be designed to give sufficient performance at low speeds, such as during engine idle, as well as being capable of running at high speeds during engine maximum speed operation. At higher engine speeds, excess energy is transferred to the accessories that may be lost.

SUMMARY OF THE INVENTION

A speed-limiting accessory drive system is provided that limits the speed range over which one or more engine-driven accessories operate while maintaining the operating speed range of the engine. A speed-limiting accessory drive system includes an engine and a battery as well as a drive motor operatively connected with the battery. At least one driven accessory is operatively connected with the drive motor. A torque-transmitting mechanism is selectively engageable to operatively connect the engine with the accessory. An engine speed sensor is operable to monitor the speed of the engine. A controller is operatively connected to the torque-transmitting mechanism, to the engine speed sensor and to the drive motor. The controller is configured to maintain the torque-transmitting mechanism in an engaged state only when the monitored engine speed is within a predetermined speed range and to control the drive motor to drive the driven accessory when the monitored engine speed is not within the predetermined range. Preferably, the predetermined speed range at which the controller maintains the torque-transmitting mechanism in an engaged state is calculated based upon the optimal speed range of the driven accessory. When the controller disengages the torque-transmitting mechanism, the controller can control the drive motor to supply torque such that the accessory is driven at a speed by the motor within an optimal speed range for the accessory. Preferably, the speed-limiting accessory drive system is part of a powertrain that includes the engine and an electro-mechanical transmission.

The speed-limiting accessory drive system may drive multiple driven accessories, in which case selective engagement of the torque-transmitting mechanism operatively connects the engine and the multiple accessories, potentially at different relative speeds. This may be accomplished by a belt and pulley torque transfer arrangement wherein different size pulleys are operatively connected with the different accessories. Alternatively, a chain and sprocket torque transfer arrangement may be used.

Preferably, the torque-transmitting mechanism is configured for operation as both an overrunning clutch and an underrunning clutch. Thus, if the engine output member (e.g., an engine crankshaft) is running at a speed below the predetermined speed range, the torque-transmitting mechanism is overrunning, i.e., the portion of the torque-transmitting mechanism operatively connected with the driven accessory is rotating faster than the portion of the torque-transmitting mechanism operatively connected with the engine. Preferably, the torque-transmitting mechanism may also operate as an underrunning clutch when the engine is running at a speed above the predetermined speed range. In this case, the portion of the clutch operatively connected with the engine is rotating faster than the portion of the clutch operatively connected with the accessories.

A method of controlling the speed of at least one driven accessory, which may be carried out using the speed-limiting accessory drive system, includes providing a drive motor adapted for driving the driven accessory as well as a torque-transmitting mechanism that is selectively engageable to operatively connect the engine with the driven accessory. The method further includes monitoring whether the torque-transmitting mechanism is in an engaged state or a disengaged state. The method includes monitoring speed of the engine and comparing monitored engine speed to a predetermined range of speeds. Finally, the method includes controlling the drive motor as well as engagement of the torque-transmitting mechanism such that the driven accessory is driven by the engine if monitored speed is within the predetermined range and is driven by the drive motor if monitored engine speed is not within the predetermined range.

The predetermined range of speeds may be from a predetermined minimum speed to a predetermined maximum speed, including both the predetermined minimum and predetermined maximum speeds. Preferably, the predetermined minimum speed and the predetermined maximum speed are calculated based on an optimal speed range for operation of the driven accessory. In this case, any speed multiplier or speed reduction in the torque transfer arrangement (e.g., the belt and pulley or chain and sprocket system) between the engine and the driven accessory is accounted for in determining the minimum and the maximum speeds.

There are four different possible modes determined under the monitoring steps. In a first mode, the monitored engine speed is not less than the predetermined minimum speed and not greater than the predetermined maximum speed and the torque-transmitting mechanism is in the engaged state. In this first mode, the torque-transmitting mechanism is maintained in the engaged state so that the driven accessory is driven by the engine.

In a second mode, the monitored engine speed is not less than the predetermined minimum speed and not greater than the predetermined maximum speed and the torque-transmitting mechanism is in the disengaged state. In this second mode, the controlling step includes engaging the torque-transmitting mechanism so that the driven accessory is driven by the engine.

In a third mode, monitored engine speed is less than the predetermined minimum speed or is greater than the predetermined maximum speed and the torque-transmitting mechanism is in the engaged state. In this third mode, the controlling step includes disengaging the torque-transmitting mechanism and controlling the motor so that the driven accessory is driven by the motor at a speed within the optimal operating speed range.

Finally, in a fourth mode, the monitored engine speed is less than the predetermined minimum speed or greater than the predetermined maximum speed and the torque-transmitting mechanism is in the disengaged state. In this fourth mode, the disengaged state of the torque-transmitting mechanism is maintained and the motor is controlled so that the driven accessory is driven by the motor at a speed within the optimal operating speed range.

Accordingly, the speed-limiting accessory drive system and the method of control described herein limit the minimum and maximum drive speed of the accessory without limiting the operating speed range of the engine. Thus, the accessory design and size can be based upon the smaller operating speed range (the range between and including the predetermined minimum and maximum speeds) rather than the operating speed range of the engine, which is likely to be a much broader range.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
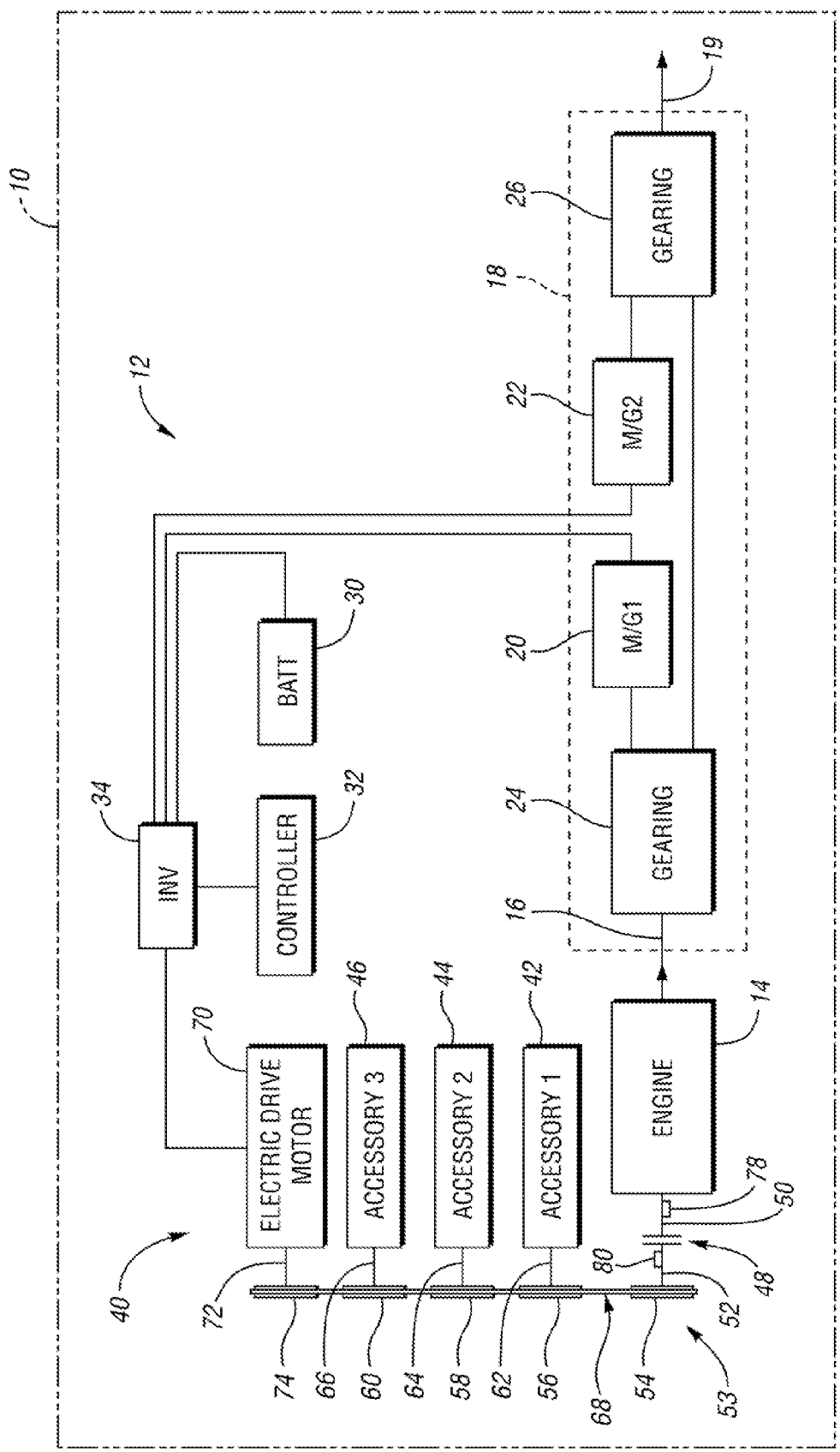
FIG. 1 is a schematic illustration of a vehicle having a speed-limiting accessory drive system within the scope of the invention.

Referring to the drawings wherein like reference numerals refer to like components, in FIG. 1 a vehicle 10 is shown schematically. The vehicle 10 has a powertrain 12 to drive the wheels (not shown) of the vehicle 10. The powertrain 12 includes an engine 14 which is operatively connected to a transmission input member 16 of a transmission 18. The transmission 18 provides power at various speed ratios to the output member 19. In this embodiment, the transmission 18 is a hybrid electro-mechanical transmission having first and second motor/generators 20, 22, respectively, that may function as either motors or generators. The first motor/generator 20 is in an input-split arrangement with the engine 14 as both are connected to different elements of the first gearing arrangement 24. The second motor/generator 22 is in an output-split arrangement in that it is connected to an element of a second gearing arrangement 26. The motor/generators 20, 22 function as motors by receiving power from an electrical power source 30, such as a battery. A controller 32 is operatively connected to the battery 30 through a power inverter module 34. The power inverter module 34 includes separate power inverters, one operatively connected to the motor/generator 20, one operatively connected to the motor/generator 22, as well as one operatively connected to a drive motor 70 (discussed below). The controller 32 causes the power inverter module 34 to provide power received from the battery 30 to either or both of the motor/generators 20, 22 so that the motor/generators 20, 22 may provide torque through the respective gearing arrangements 24, 26. If the motor/generators 20, 22 are to function as generators, the controller 32 controls them to receive power from the respective gearing arrangements 24, 26. Those skilled in the art will readily understand the functional operation of a hybrid transmission. It should be appreciated that, although a hybrid electrically variable transmission is illustrated, a non-hybrid manual or automatic transmission may be used within the scope of the invention.

A speed-limiting accessory drive system 40 allows the engine 14 to selectively drive multiple accessories, accessory 42, accessory 44, and accessory 46. The accessories may include but are not limited to a power steering pump, a water pump and an air conditioning compressor. The first accessory 42 is a power steering pump, the second accessory 44 is a water pump, and the third accessory is an air conditioning compressor, for purposes of illustration.

The speed-limiting accessory drive system 40 includes a torque-transmitting mechanism 48 which is preferably a rotating friction clutch. The torque-transmitting mechanism 48 is selectively engageable under the control of controller 32 through hydraulic, electric or other communication means to connect a crankshaft 50 of engine 14 with an accessory drive shaft 52. A rotatable member 54 is connected for common rotation with the accessory drive shaft 52. A torque-transmitting arrangement 53 connects the rotatable member 54 such that rotation of the rotatable member 54 drives the accessories, 42, 44 and 46. The torque-transmitting arrangement 53 includes rotatable members 56, 58 and 60 connected for common rotation with drive shafts 62, 64 and 66, respectively, of the accessories 42, 44 and 46. An endless rotation transferring device 68 connects the rotatable member 54 with the rotatable members 56, 58 and 60 such that the rotation of the rotatable member 54 may cause rotation of the other rotatable members 56, 58 and 60 via the endless rotation transferring device 68. Within the scope of the invention, the rotatable members 54, 56, 58 and 60 may be pulleys and the rotation transferring device 68 may be an endless belt. Alternatively, within the scope of the invention, the rotatable members 54, 56, 58 and 60 may be sprockets and the rotation transfer device 68 may be a chain. It should be appreciated, that the rotatable members 54, 56, 58 and 60 may have different radial dimensions so that the rotation transfer device causes rotation of the respective drive shaft 62, 64, 66 at different relative speeds.

The speed-limiting accessory drive system 40 also includes an electric drive motor 70 operatively connected with the accessories 42, 44 and 46 via an electric drive motor shaft 72 and rotatable member 74 that is also operatively connected to the rotatable members 56, 58 and 60 through the rotation transfer device 68. The controller 32 controls operation of the electric drive motor 70 through another power inverter included in the power inverter module 34, commanding it to spin freely with rotation of the rotatable member 74 or commanding it to provide torque to drive the rotatable member 74. Specifically, the controller 32 is configured with a stored algorithm that controls the engagement of the torque-transmitting mechanism 48 between an engaged state in which the engine 14 may drive the accessories 42, 44, 46 via the torque-transmitting arrangement 53 and a disengaged state in which the controller drives the accessories 42, 44, 46 via the electric drive motor 70 so that the electric drive motor 70, acts as a motor providing torque through the torque-transmitting arrangement 53.

The speed-limiting accessory drive system 40 includes a sensor 78 operatively connected to the engine crankshaft 50 and to the controller 32 (transfer conductors connecting the sensor 78 with the controller 32 not shown for purposes of simplicity in the drawing). The sensor 78 senses speed of the crankshaft 50 and provides this information to the controller 32. The speed-limiting accessory drive system 40 also includes a sensor 80 operatively connected to the controller 32 and to the accessory drive shaft 52 that enables the controller 32 to determine whether the torque-transmitting mechanism 48 is in an engaged state or a disengaged state. For example, the sensor 80 may be a strain gauge connected with the accessory drive shaft 52.

Figure 2:
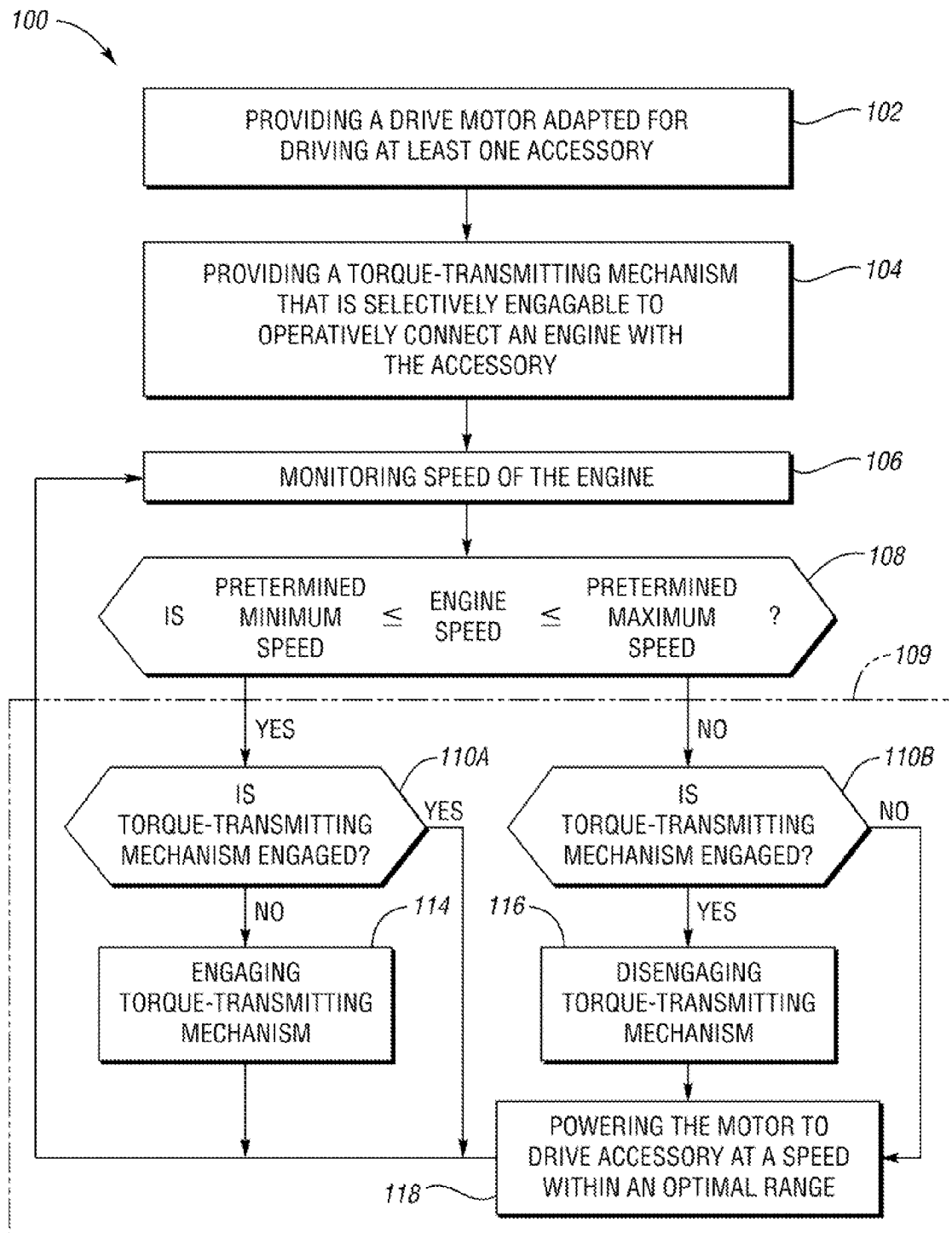
FIG. 2 is a flow chart illustrating a method of controlling the speed of at least one driven accessory.

Referring to FIG. 2, an algorithm within the controller controls the speed-limiting accessory drive system 40 according to the method 100 illustrated in the flow chart of FIG. 2. The method 100 includes step 102, providing a drive motor adapted for driving at least one accessory. Method 100 also includes step 104, providing a torque-transmitting mechanism that is selectively engageable to operatively connect an engine with the accessory. The method 100 further includes step 106, monitoring speed of the engine. After step 106, the method 100 includes step 108, comparing the monitored engine speed with a predetermined range of speeds. This preferably includes determining whether the engine speed is greater than or equal to a predetermined minimum speed and also whether the engine speed is less than or equal to a predetermined maximum speed. The predetermined minimum speed and the predetermined maximum speed may be based upon the optimal operating speed of the accessory or accessories. For example, the optimal operating speed ranges of the first, second and third accessories, 42, 44 and 46 can be stored within the controller 32. The accessory having the greatest lower minimum speed is used by the controller 32 to determine minimum speed. The accessory having the lowest upper maximum speed may be used by the controller 32 to determine the maximum speed. Based on the determination of step 108, under step 109, the controller 32 controls power to the drive motor 72 and engagement of the torque-transmitting mechanism 48 so that the accessories 42, 44 and 46 are driven by the engine 14 if the engine speed is within the predetermined range of speeds and is driven by the drive motor 70 if monitored engine speed is not within the predetermined range of speeds.

If it is determined in step 108 that the engine speed is within the predetermined range, then step 109 includes step 110A in which the controller 32 determines whether the torque-transmitting mechanism 48 is engaged. If the torque-transmitting mechanism 48 is engaged, then it continues to be maintained in the engaged state, as this is the most optimal manner for driving the accessories 42, 44 and 46. The method 100 then continues to monitor engine speed under step 108. However, if it is determined in step 110A that the torque-transmitting mechanism 48 is not engaged, then the method 100 moves to step 114, engaging the torque-transmitting mechanism 48. The engaging step 114, thus occurs during a first mode of operating conditions in which the engine 14 is determined to be within a predetermined speed range so that the controller 32 allows the engine 14 to drive the accessories 42, 44 and 46. The method 100 then continues to monitor the engine speed under step 108.

If in step 108 it is determined that the monitored engine speed is not within the predetermined range, then step 109 includes step 110B (which is comparable with step 110A), determining whether the torque-transmitting mechanism 48 is engaged. If the torque-transmitting mechanism 48 is determined to be engaged, method 100 then includes disengaging torque-transmitting mechanism 48 in step 116 and powering the motor 70 in step 118 so that the motor 70 drives the accessories 42, 44, 46 at a speed within an optimal range for the accessories 42, 44, 46. If in step 108 it is instead determined that the monitored engine speed is not within the predetermined range and under step 110B it is determined that the torque-transmitting mechanism 48 is not engaged, the method 100 goes directly to step 118 in which the controller 32 controls power to the motor 70 to drive the accessories within the optimal speed range.

Thus, in a first mode of operating conditions in which engine speed is within the predetermined range, under step 108, the controller 32 will determine that the engine speed is within the predetermined range (i.e., it is greater than or equal to the predetermined minimum speed and less than or equal to the predetermined maximum speed). In this instance, step 110A will result in engaging the torque-transmitting mechanism 48 if it is disengaged via step 114 or maintaining it in the engaged state if it is already engaged so that the engine 14 drives the accessories 42, 44 and 46 via the torque-transmitting arrangement 53.

In a second mode of operating conditions in which the monitored speed of the engine is zero, such as when the engine is turned off and the vehicle 10 is being powered by the motor/generators 20, 22, the method 100 determines in step 108 that the engine speed is less than the predetermined minimum speed. Under step 110B, the method 100 determines whether the torque-transmitting mechanism is engaged and, if it is engaged, disengages the torque-transmitting mechanism in step 116. The method 100 then controls power to the motor 70 under step 118 such that the motor 70 drives the accessories 42, 44 and 46.

In a third operating mode, the monitored engine speed of step 106 is a non-zero value but is less than the predetermined minimum speed. In this instance, after step 108 the controller will move to step 110B and either disengage the torque-transmitting mechanism 48 in step 116 or move directly to step 118 (if the torque-transmitting mechanism 48 is not engaged) so that power is provided by the motor 70 to drive the accessories 42, 44 and 46 at a speed within the optimal range.

Finally, in a fourth operating mode, the monitored engine speed of step 106 is greater than the predetermined maximum speed. Under step 108, the method 100 will move to step 110B and, if the torque-transmitting mechanism 48 is engaged, it will be disengaged under step 116 and, whether or not the torque-transmitting mechanism was determined to be engaged under step 110B, under step 118 power will be provided by the motor 70 to drive the accessories 42, 44, 46 within the optimal range for the accessories 42, 44 and 46.

While the best modes for carrying out the invention have been described in detail, those familiar with the art to which this invention relates will recognize various alternative designs and embodiments for practicing the invention within the scope of the appended claims.

The invention claimed is:

1. A method of controlling the speed of at least one driven accessory comprising:
    providing a drive motor adapted for driving said at least one driven accessory;
wherein said at least one driven accessory is characterized by an optimal operating speed range;
    providing a torque-transmitting mechanism selectively engagable to operatively connect an engine with said at least one driven accessory;
    monitoring whether the torque-transmitting mechanism is in an engaged state or a disengaged state;
    monitoring speed of the engine;
    comparing monitored engine speed to a predetermined range of speeds from a predetermined minimum speed to a predetermined maximum speed, including the predetermined minimum and the predetermined maximum;
    wherein the predetermined minimum speed and the predetermined maximum speed are calculated based on the optimal operating speed range; and
    controlling power to said drive motor and engagement of the torque-transmitting mechanism such that said at least one driven accessory is driven by the engine if monitored engine speed is within the predetermined range and is driven by the drive motor if monitored engine speed is not within the predetermined range; wherein said controlling includes engaging the torque-transmitting mechanism so that said at least one driven accessory is driven by the engine if monitored engine speed is not less than the predetermined minimum speed and not greater than the predetermined maximum speed and the torque-transmitting mechanism is in the disengaged state;

disengaging the torque-transmitting mechanism and controlling power to the motor so that said at least one driven accessory is driven by the motor at a speed within the optimal operating speed range if monitored engine speed is less than the predetermined minimum speed or greater than the predetermined maximum speed and the torque-transmitting mechanism is in the engaged state; and powering the motor so that said at least one driven accessory is driven by the motor at a speed within the optimal operating speed range if monitored engine speed is less than the predetermined minimum speed or greater than the predetermined maximum speed and the torque-transmitting mechanism is in the disengaged state.

2. A speed-limiting accessory drive system comprising:
an engine;
a battery;
a drive motor operatively connected with said battery;
at least one driven accessory characterized by an optimal operating speed range; wherein said drive motor is operatively connected to said at least one driven accessory;
a torque-transmitting mechanism selectively engagable to operatively connect said engine with said at least one driven accessory;
a sensor operable for monitoring speed of said engine; and
a controller operatively connected to said torque-transmitting mechanism, to said engine speed sensor and to said drive motor and configured to maintain said torque-transmitting mechanism in an engaged state only when monitored engine speed is within a predetermined speed range and to control said drive motor to drive said at least one driven accessory when monitored engine speed is not within said predetermined speed range; wherein said predetermined speed range is calculated based on said optimal operating speed range of said at least one driven accessory.

3. The speed-limiting accessory drive system of claim 2, wherein said engine is adapted for operative connection to a hybrid transmission; and wherein said battery is also adapted for powering the hybrid transmission.

4. The speed-limiting accessory drive system of claim 2, wherein the at least one driven accessory includes multiple driven accessories; and wherein selective engagement of the torque-transmitting mechanism operatively connects the engine and the multiple driven accessories at different relative speeds.

5. The speed-limiting accessory drive system of claim 2, wherein a torque transfer arrangement operatively connects the engine and the multiple engine accessories when the torque-transmitting mechanism is engaged and also operatively connects the drive motor and the multiple driven accessories.

6. The speed-limiting accessory drive system of claim 5, wherein said torque transfer arrangement includes a plurality of pulleys operatively connected by an endless belt.

7. The speed-limiting accessory drive system of claim 5, wherein said torque transfer arrangement includes a plurality of sprockets operatively connected by an endless chain.

8. The speed-limiting accessory drive system of claim 2, wherein said torque-transmitting mechanism is configured for operation as both an overrunning clutch and an underrunning clutch.

9. The speed-limiting accessory drive system of claim 2, further comprising:
a second sensor operable for monitoring whether the torque-transmitting mechanism is an engaged or a disengaged state.

10. A powertrain comprising:
an electromechanical transmission including at least one motor/generator and a transmission gearing arrangement connectable with said at least one motor/generator;
an engine operable for powering said transmission;
a battery operatively connected with said at least one motor/generator to provide power thereto, or receive power therefrom;
a drive motor operatively connected with said battery;
multiple driven accessories each having a respective optimal operating speed range including a respective minimum optimal operating speed and a respective maximum optimal operating speed; wherein said drive motor is operatively connected to said multiple driven accessories for driving said multiple driven accessories at different relative speeds;
a torque-transmitting mechanism selectively engagable to operatively connect said engine with said multiple driven accessories;
a sensor operable for monitoring speed of said engine; and
a controller operatively connected to said torque-transmitting mechanism, to said engine speed sensor and to said drive motor and configured to maintain said torque-transmitting mechanism in an engaged state only when monitored engine speed is within a predetermined speed range and to control said drive motor to drive said multiple driven accessories when monitored engine speed is not within said predetermined speed range; wherein said predetermined speed range is calculated based on a greatest of said respective minimum optimal operating speeds and a least of said respective maximum optimal operating speeds.

* * * * *